(12) United States Patent
Guo et al.

(10) Patent No.: US 10,148,765 B2
(45) Date of Patent: Dec. 4, 2018

(54) SECURITY INFORMATION INTERACTION SYSTEM, DEVICE AND METHOD

(71) Applicant: CHINA UNIONPAY CO., LTD., Shanghai (CN)

(72) Inventors: Wei Guo, Shanghai (CN); Chengqian Chen, Shanghai (CN); Yu Zhou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 297 days.

(21) Appl. No.: 14/888,042

(22) PCT Filed: May 19, 2014

(86) PCT No.: PCT/CN2014/077776
§ 371 (c)(1),
(2) Date: Oct. 29, 2015

(87) PCT Pub. No.: WO2014/187292
PCT Pub. Date: Nov. 27, 2014

(65) Prior Publication Data
US 2016/0080503 A1    Mar. 17, 2016

(30) Foreign Application Priority Data
May 21, 2013 (CN) .......................... 2013 1 0189339

(51) Int. Cl.
*H04L 29/08*    (2006.01)
*G06Q 20/42*    (2012.01)
(Continued)

(52) U.S. Cl.
CPC ....... *H04L 67/141* (2013.01); *G06Q 20/3278* (2013.01); *G06Q 20/353* (2013.01);
(Continued)

(58) Field of Classification Search
CPC ... H04L 63/18; H04L 63/0209; H04L 67/104; H04L 67/141; H04W 12/08;
(Continued)

(56) References Cited

U.S. PATENT DOCUMENTS

2007/0207798 A1*   9/2007   Talozi ................. G06F 11/3688
                                                                                 455/423
2013/0179499 A1*   7/2013   Liang ................. G06K 7/10227
                                                                                 709/203

FOREIGN PATENT DOCUMENTS

CN          101576983 A     11/2009
CN          102053917 A      5/2011
(Continued)

OTHER PUBLICATIONS

"R Global System for Mobile Communications" Digital cellular telecommunications system (Phase 2+); Specification of the SIM Application Toolkit for the Subscriber Identity module—Mobile Equipment (SIM—ME) interface (GSM 11.14); GSM 11.14, IEEE, LIS, Sophia Antipolis Cedex, France, vol. SMG9, No. 5.2.0, Dec. 1, 1996 (Dec. 1, 1996), XP014011739, ISSN: 0000-0001.

*Primary Examiner* — Kim T Nguyen
(74) *Attorney, Agent, or Firm* — The Ollila Law Group LLC

(57) ABSTRACT

The invention discloses a security information interaction system, apparatus and method, the method comprising the following steps: establishing a first communication channel and a second communication channel between a security information interaction terminal and a security carrier; the security carrier actively sending a command to the security information interaction terminal via the first communication channel and the second communication channel so as to complete a corresponding security information interaction procedure. With the security information interaction system, apparatus and method disclosed by the invention, the secu-
(Continued)

rity carrier can send a command to the security information interaction terminal flexibly and actively on its own, and thus greatly improving the efficiency of the security information interaction system.

6 Claims, 2 Drawing Sheets

(51) Int. Cl.
    *H04L 29/06*     (2006.01)
    *H04W 12/08*     (2009.01)
    *G06Q 20/32*     (2012.01)
    *G06Q 20/34*     (2012.01)
    *G06Q 20/38*     (2012.01)
    *H04W 4/80*     (2018.01)

(52) U.S. Cl.
    CPC ......... *G06Q 20/382* (2013.01); *G06Q 20/425* (2013.01); *H04L 63/0209* (2013.01); *H04L 63/18* (2013.01); *H04L 67/104* (2013.01); *H04W 12/08* (2013.01); *H04W 4/80* (2018.02)

(58) Field of Classification Search
    CPC . H04W 4/008; G06Q 20/425; G06Q 20/3278; G06Q 20/353; G06Q 20/382
    See application file for complete search history.

(56) References Cited

FOREIGN PATENT DOCUMENTS

| | | |
|---|---|---|
| CN | 202026326 U | 11/2011 |
| CN | 102917357 A | 2/2013 |
| EP | 2461551 A1 | 6/2012 |
| EP | 2620897 A1 | 7/2013 |
| WO | 2012037791 A1 | 3/2012 |

\* cited by examiner

SECURITY INFORMATION INTERACTION SYSTEM, DEVICE AND METHOD

FIELD OF THE INVENTION

The invention relates to information interaction system, apparatus and method, and in particular, to security information interaction system, apparatus and method.

BACKGROUND

Currently, as computers and network are becoming more and more widely used and business types in different areas are becoming increasingly abundant, systems, apparatus and method for security information interaction (i.e., information interaction having a high demand on safety, e.g., a transaction processing procedure in financial area), especially the security information interaction system based on a mobile terminal, are becoming more and more important.

A basic operational process of the technical solution in the prior art is as follows: when a security carrier (e.g., a SIM card, a SD card) need to initiate a command actively to a security information interaction terminal (e.g., a mobile terminal) so as to use the functions provided by the security information interaction terminal, the security information interaction terminal has to firstly send a command to the security carrier and trigger a subsequent flow process according to the returned value to the command from the security carrier, i.e., a fetch instruction is sent to the security carrier to obtain the command in the security carrier, and thus completing a relevant security carrier information interaction procedure.

However, the technical solution in the prior art has the following problem: since the security information interaction terminal has to firstly send a command to the security carrier and trigger a subsequent flow process according to the returned value to the command from the security carrier (i.e., obtain the command in the security carrier), when the security carrier need to initiate a command actively to the security information interaction terminal so as to use the functions provided by the security information interaction terminal, a situation will happen in which a command to trigger the subsequent process cannot be transmitted accurately and timely since the security information interaction terminal does not know the timing, moreover, if the security information interaction terminal uses a periodical polling mechanism to continuously inquire the status of the security carrier, the following problem will still arise: a tremendous computing resource of the security information interaction terminal will be consumed, and the security carrier still cannot send the command flexibly and actively on its own.

Therefore, there exists a need to provide security information interaction system, apparatus and method that enable the security carrier to send the command to the security information interaction terminal flexibly and actively on its own.

SUMMARY OF THE INVENTION

In order to solve the existing problems in the above prior art technical solution, the invention proposes a security information interaction system, apparatus and method that enable the security carrier to send the command to the security information interaction terminal flexibly and actively on its own.

The object of the invention is achieved by the following technical solution:

a security information interaction system which comprises a security information interaction terminal and a security carrier, wherein the security carrier actively sends a command to the security information interaction terminal via a first communication channel and a second communication channel established between the security information interaction terminal and the security carrier so as to complete a corresponding security information interaction procedure.

Preferably, in the above disclosed solution, when the security carrier need to actively send a command to the security information interaction terminal, the security carrier sends a notification event message to the security information interaction terminal via the first communication channel so as to initiate a session between the security information interaction terminal and the security carrier.

Preferably, in the above disclosed solution, after receiving the notification event message, the security information interaction terminal sends a command reading instruction to the security carrier via the second communication channel so as to obtain the command of the security carrier, and subsequently processes the obtained command of the security carrier and returns the processing result to the security carrier.

Preferably, in the above disclosed solution, after receiving the processing result from the security information interaction terminal, the security carrier sends a status indicating message to the security information interaction terminal, wherein the status indicating message indicates whether there is a subsequent command.

Preferably, in the above disclosed solution, the security information interaction terminal receives and analyzes the status indicating message, and if the status indicating message indicates there exist a subsequent command, the security information interaction terminal sends a command reading instruction to the security carrier via the second communication channel so as to obtain the subsequent command of the security carrier, and if the status indicating message indicates there exist no subsequent command, the security information interaction terminal terminates the initiated session.

Preferably, in the above disclosed solution, the first communication channel is a communication channel in a peer-to-peer mode.

Preferably, in the above disclosed solution, the second communication channel is a communication channel in a command/response mode in which the security information interaction terminal functions as an active party.

The object of the invention can be also achieved by the following technical solution:

a security information interaction terminal which can receive and process a command initiated actively by a security carrier via a first communication channel and a second communication channel established between the security information interaction terminal and the security carrier so as to complete a corresponding security information interaction procedure.

The object of the invention can be also achieved by the following technical solution:

a security carrier which can actively send a command to a security information interaction terminal via a first communication channel and a second communication channel established between the security information interaction terminal and the security carrier so as to complete a corresponding security information interaction procedure.

The object of the invention can be also achieved by the following technical solution:

a security information interaction method comprising the following steps:

(A1) establishing a first communication channel and a second communication channel between a security information interaction terminal and a security carrier;

(A2) the security carrier actively sending a command to the security information interaction terminal via the first communication channel and the second communication channel so as to complete a corresponding security information interaction procedure.

The security information interaction system, apparatus and method disclosed by the invention have the following advantages: the security carrier can send a command to the security information interaction terminal flexibly and actively on its own, and thus greatly improving the efficiency of the security information interaction system.

BRIEF DESCRIPTION OF THE DRAWINGS

The technical features and advantages of the invention will be better understood by those skilled in the art with reference to the accompanying drawings, in which.

DETAILED DESCRIPTION OF THE UTILITY MODEL

Figure 1:
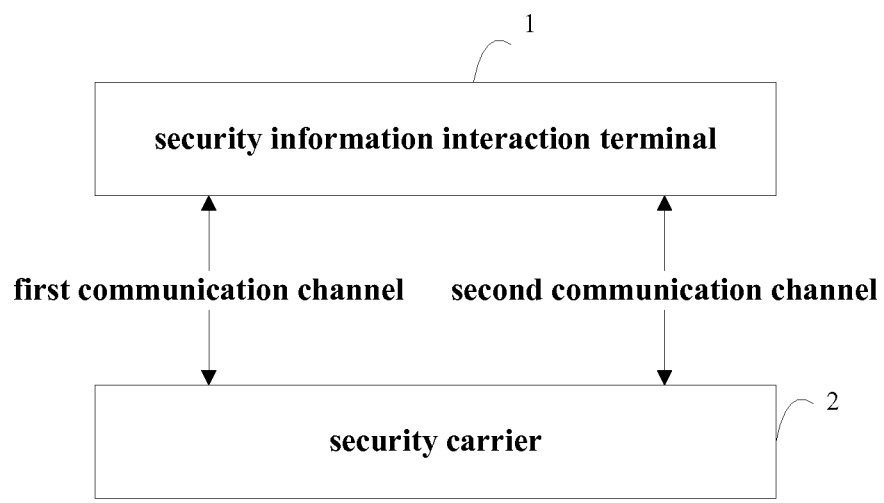
FIG. 1 is a schematic structure view of the security information interaction system according to an embodiment of the invention.

FIG. 1 is a schematic structure view of the security information interaction system according to an embodiment of the invention. As shown in FIG. 1, the security information interaction system disclosed by the invention comprises a security information interaction terminal 1 and a security carrier 2, wherein the security carrier 2 (i.e., an carrier which can store and run a security application therein for performing a security information interaction procedure) actively sends a command to the security information interaction terminal 1 via a first communication channel and a second communication channel established between the security information interaction terminal 1 and the security carrier 2 so as to complete a corresponding security information interaction procedure.

Preferably, in the security information interaction system disclosed by the invention, when the security carrier 2 need to actively send a command to the security information interaction terminal 1, the security carrier 2 sends a notification event message to the security information interaction terminal 1 via the first communication channel so as to initiate a session between the security information interaction terminal 1 and the security carrier 2.

Preferably, in the security information interaction system disclosed by the invention, after receiving the notification event message, the security information interaction terminal 1 sends a command reading instruction to the security carrier 2 via the second communication channel so as to obtain the command of the security carrier 2, and subsequently processes the obtained command of the security carrier 2 and returns the processing result to the security carrier 2.

Preferably, in the security information interaction system disclosed by the invention, after receiving the processing result from the security information interaction terminal 1, the security carrier 2 sends a status indicating message to the security information interaction terminal 1, wherein the status indicating message indicates whether there exists a subsequent command.

Preferably, in the security information interaction system disclosed by the invention, the security information interaction terminal 1 receives and analyzes the status indicating message, and if the status indicating message indicates there exists a subsequent command, the security information interaction terminal 1 sends a command reading instruction to the security carrier 2 via the second communication channel so as to obtain the subsequent command of the security carrier 2, and if the status indicating message indicates there exists no subsequent command, the security information interaction terminal 1 terminates the initiated session.

By way of example, in the security information interaction system disclosed by the invention, the security carrier 2 is a SIM card or an smart SD card.

By way of example, in the security information interaction system disclosed by the invention, the security information interaction terminal 1 is a mobile terminal (e.g., a smart cell phone) or a POS machine.

By way of example, in the security information interaction system disclosed by the invention, the first communication channel is a communication channel in an peer-to-peer mode, such as a communication channel based on SWP protocol.

By way of example, in the security information interaction system disclosed by the invention, the second communication channel is a communication channel in a command/response mode in which the security information interaction terminal 1 is an active party, such as a communication channel based on ISO7816 protocol or standard SD card interface protocol.

In an exemplary embodiment, the security information interaction terminal 1 is a cell phone, the security carrier 2 is a SIM card, the first communication channel is a communication channel based on SWP protocol, the second communication channel is a communication channel based on ISO7816 protocol, and the basic operational process of the exemplary security information interaction system is as follows: (1) a communication channel based on ISO7816 protocol is established between the cell phone and the SIM card, and a communication channel based on SWP protocol is established between the SIM card and a NFC controller in the cell phone; (2) when the SIM card need to actively send a command to the cell phone, the SIM card sends a notification event message to the cell phone via the communication channel based on SWP protocol so as to initiate a session; after the cell phone receives the notification event message, a Fetch instruction is sent to the SIM card via the communication channel based on ISO7816 protocol so as to obtain a STK command from the SIM card for processing, and the processed result data is sent back to the SIM card in a form of Terminal Response instruction via the communication channel based on ISO7816 protocol, and if the SIM card still has a subsequent command now, the SIM card returns a status word 91XX for the Terminal Response instruction, and subsequently the cell phone continues to send a Fetch instruction to the SIM card via the communication channel based on ISO7816 protocol so as to obtain the command for subsequent processing, and if there exists no subsequent command, the SIM card returns a status word 9000 for the Terminal Response instruction, thereby indicating a termination of the current session of the SIM card; (3) if the SIM need to initiate a next session, the communication channel based on SWP protocol can be used again to send a notification event message to the cell phone.

As can be seen from the above, the security information interaction system disclosed by the invention has the following advantages: the security carrier can send a command to the security information interaction terminal flexibly and actively on its own, and thus greatly improving the efficiency of the security information interaction system.

As shown in FIG. 1 the invention discloses a security information interaction terminal 1 which can receive and process a command initiated actively by a security carrier 2 via a first communication channel and a second communication channel established between the security information interaction terminal 1 and the security carrier 2 so as to complete a corresponding security information interaction procedure.

Preferably, after receiving a notification event message from the security carrier 2 via the first communication channel, the security information interaction terminal 1 disclosed by the invention sends a command reading instruction to the security carrier 2 via the second communication channel so as to obtain the command of the security carrier 2, and subsequently processes the obtained command of the security carrier 2 and returns the processing result to the security carrier 2.

Preferably, the security information interaction terminal 1 disclosed by the invention receives and analyzes a status indicating message from the analyze carrier 2, and if the status indicating message indicates there exists a subsequent command, the security information interaction terminal 1 sends a command reading instruction to the security carrier 2 via the second communication channel so as to obtain the subsequent command of the security carrier 2, and if the status indicating message indicates there exists no subsequent command, the security information interaction terminal 1 terminates the initiated session.

By way of example, the security information interaction terminal 1 disclosed by the invention is a mobile terminal (e.g., a smart cell phone) or a POS machine.

By way of example, in the security information interaction terminal disclosed by the invention, the first communication channel is a communication channel in an peer-to-peer mode, such as a communication channel based on SWP protocol.

By way of example, in the security information interaction terminal disclosed by the invention, the second communication channel is a communication channel in a command/response mode in which the security information interaction terminal 1 is an active party, such as a communication channel based on ISO7816 protocol or standard SD card interface protocol.

As shown in FIG. 1, the invention discloses a security carrier 2 (i.e., an carrier which can store and run a security application therein for performing a security information interaction procedure) which can actively send a command to the security information interaction terminal 1 via a first communication channel and a second communication channel established between the security information interaction terminal 1 and the security carrier 2 so as to complete a corresponding security information interaction procedure.

Preferably, when the security carrier 2 disclosed by the invention need to actively send a command to the security information interaction terminal 1, the security carrier 2 sends a notification event message to the security information interaction terminal 1 via the first communication channel so as to initiate a session between the security information interaction terminal 1 and the security carrier 2.

Preferably, after receiving a processing result from the security information interaction terminal 1, the security carrier 2 disclosed by the invention sends a status indicating message to the security information interaction terminal 1, wherein the status indicating message indicates whether there exists a subsequent command.

By way of example, the security carrier 2 disclosed by the invention is a SIM card or an smart SD card.

By way of example, in the security carrier disclosed by the invention, the first communication channel is a communication channel in a peer-to-peer mode, such as a communication channel based on SWP protocol.

By way of example, in the security carrier disclosed by the invention, the second communication channel is a communication channel in a command/response mode in which the security information interaction terminal 1 function as an active party, such as a communication channel based on ISO7816 protocol or standard SD card interface protocol.

Figure 2:
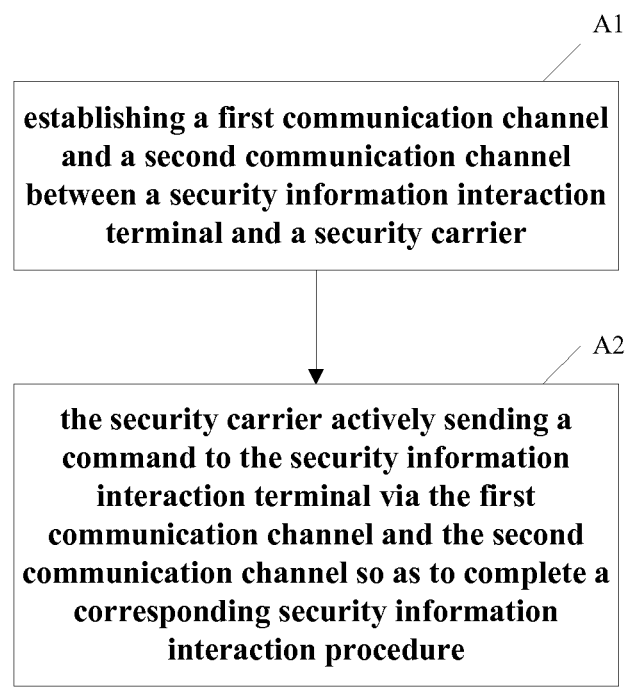
FIG. 2 shows a flowchart of the security information interaction method according to an embodiment of the invention.

FIG. 2 shows a flowchart of the security information interaction method according to an embodiment of the invention. As shown in FIG. 2, the security information interaction method disclosed by the invention comprises the following steps: (A1) establishing a first communication channel and a second communication channel between a security information interaction terminal and a security carrier; (A2) the security carrier (i.e., a carrier which can store and run a security application therein for performing a security information interaction procedure) actively sending a command to the security information interaction terminal via the first communication channel and the second communication channel so as to complete a corresponding security information interaction procedure.

Preferably, in the security information interaction method disclosed by the invention, the step (A2) further comprises: when the security carrier need to actively send a command to the security information interaction terminal, the security carrier sends a notification event message to the security information interaction terminal via the first communication channel so as to initiate a session between the security information interaction terminal and the security carrier.

Preferably, in the security information interaction method disclosed by the invention, the step (A2) further comprises: after receiving the notification event message, the security information interaction terminal sends a command reading instruction to the security carrier via the second communication channel so as to obtain the command of the security carrier, and subsequently processes the obtained command of the security carrier and returns the processing result to the security carrier Preferably, in the security information interaction method disclosed by the invention, the step (A2) further comprises: after receiving the processing result from the security information interaction terminal, the security carrier sends a status indicating message to the security information interaction terminal, wherein the status indicating message indicates whether there exists a subsequent command.

Preferably, in the security information interaction method disclosed by the invention, the step (A2) further comprises: the security information interaction terminal receives and analyzes the status indicating message, and if the status indicating message indicates there exists a subsequent command, the security information interaction terminal sends a command reading instruction to the security carrier via the second communication channel so as to obtain the subsequent command of the security carrier, and if the status indicating message indicates there exists no subsequent command, the security information interaction terminal terminates the initiated session.

By way of example, in the security information interaction method disclosed by the invention, the security carrier is a SIM card or an smart SD card.

By way of example, in the security information interaction method disclosed by the invention, the security information interaction terminal is a mobile terminal (e.g., a smart cell phone) or a POS machine.

By way of example, in the security information interaction method disclosed by the invention, the first communication channel is a communication channel in an peer-to-peer mode, such as a communication channel based on SWP protocol.

By way of example, in the security information interaction method disclosed by the invention, the second communication channel is a communication channel in a command/response mode in which the security information interaction terminal 1 function as an active party, such as a communication channel based on ISO7816 protocol or standard SD card interface protocol.

As can be seen from the above, the security information interaction method disclosed by the invention has the following advantages: the security carrier can send a command to the security information interaction terminal flexibly and actively on its own, and thus greatly improving the efficiency of the security information interaction system.

While the invention has been described by means of the above preferred embodiments, the ways of implementing the invention are not limited to the above described embodiments. It will be appreciated that various modifications and variations can be made to the invention by those skilled in the art without departing form the spirit and scope of the invention.

The invention claimed is:

1. A security information interaction system comprising a security information interaction terminal and a security carrier, wherein the security carrier actively sends a command to the security information interaction terminal at its discretion via a first communication channel and a second communication channel established between the security information interaction terminal and the security carrier so as to complete a corresponding security information interaction procedure, wherein when the security carrier need to actively send a command to the security information interaction terminal, the security carrier sends a notification event message to the security information interaction terminal via the first communication channel so as to initiate a session between the security information interaction terminal and the security carrier and wherein after receiving the notification event message, the security information interaction terminal sends a command reading instruction to the security carrier via the second communication channel using a different protocol from the first communication channel so as to obtain the command of the security carrier, and subsequently processes the obtained command of the security carrier and returns a processing result to the security carrier.

2. The security information interaction system according to claim 1, characterized in that after receiving the processing result from the security information interaction terminal, the security carrier sends a status indicating message to the security information interaction terminal, wherein the status indicating message indicates whether there exists a subsequent command.

3. The security information interaction system according to claim 2, characterized in that the security information interaction terminal receives and analyzes the status indicating message, if the status indicating message indicates there exists a subsequent command, the security information interaction terminal sends a command reading instruction to the security carrier via the second communication channel so as to obtain the subsequent command of the security carrier, and if the status indicating message indicates there exists no subsequent command, the security information interaction terminal terminates the initiated session.

4. The security information interaction system according to claim 3, characterized in that the first communication channel is a communication channel in a peer-to-peer mode.

5. The security information interaction system according to claim 4, characterized in that the second communication channel is a communication channel in a command/response mode in which the security information interaction terminal functions as an active party.

6. A security information interaction method comprising the following steps:
(A1) establishing a first communication channel and a second communication channel between a security information interaction terminal and a security carrier;
(A2) the security carrier actively sending a command to the security information interaction terminal at its discretion via the first communication channel and the second communication channel so as to complete a corresponding security information interaction procedure,
wherein step (A2) comprises:
when the security carrier need to actively send a command to the security information interaction terminal, the security carrier sends a notification event message to the security information interaction terminal via the first communication channel so as to initiate a session between the security information interaction terminal and the security carrier, and wherein after receiving the notification event message, the security information interaction terminal sends a command reading instruction to the security carrier via the second communication channel using a different protocol than the first communication channel so as to obtain the command of the security carrier, and subsequently processes the obtained command of the security carrier and returns a processing result to the security carrier.

* * * * *